Dec. 10, 1946.     H. H. VANDERZEE     2,412,436
FLUID OPERATED CLUTCH
Filed March 22, 1944     2 Sheets-Sheet 2
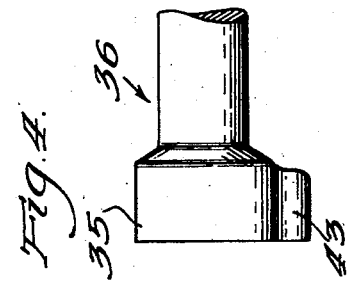
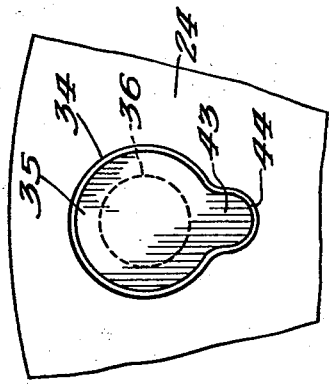
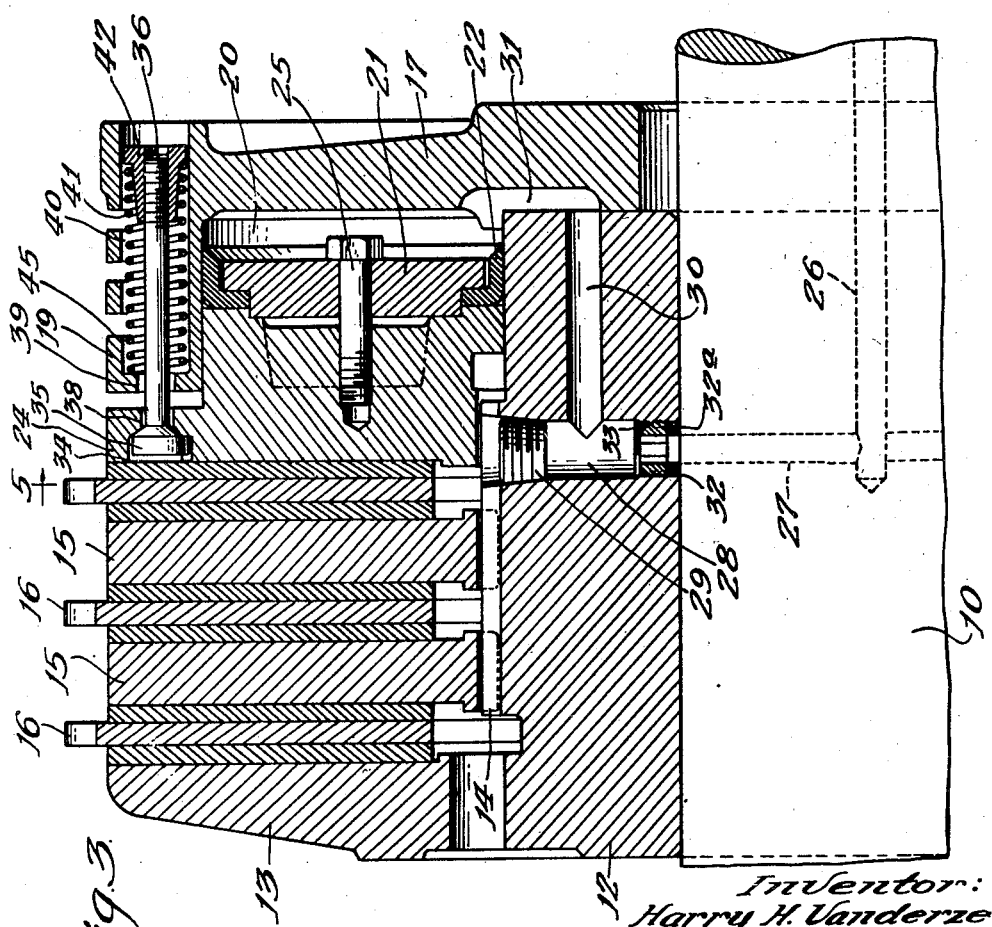

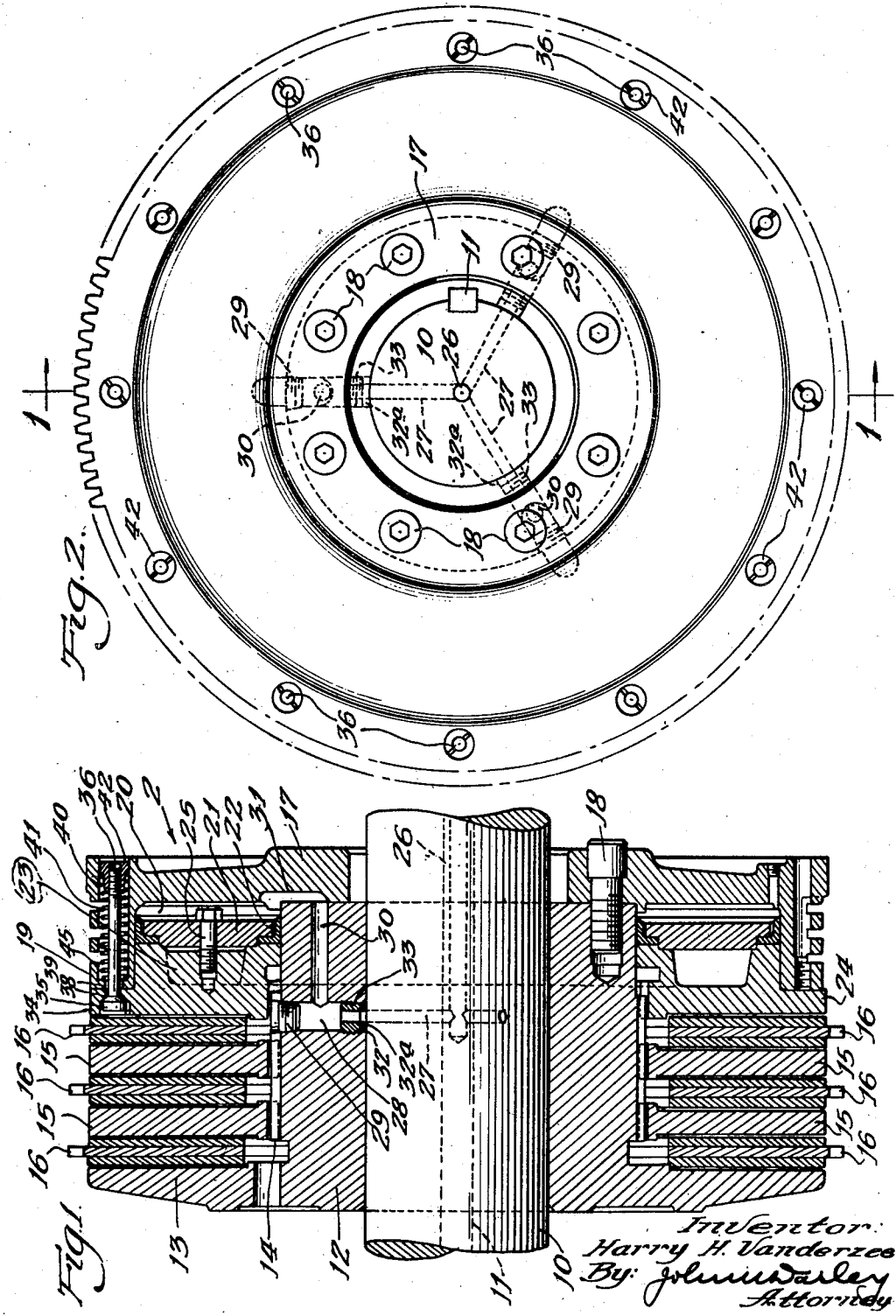

Patented Dec. 10, 1946

2,412,436

UNITED STATES PATENT OFFICE 2,412,436

FLUID OPERATED CLUTCH

Harry H. Vanderzee, Racine, Wis., assignor to Twin Disc Clutch Company, Racine, Wis., a corporation of Wisconsin.

Application March 22, 1944, Serial No. 527,620

6 Claims. (Cl. 192—85)

My invention relates to clutches and more particularly to those of the fluid actuated type in which any selected fluid under pressure, either gas or liquid, is applied to a piston which constitutes the actuating element of the clutch.

Clutches of this general type wherein an annular piston applies the engaging pressure are well known and, for certain installations, they possess a number of advantages over the more common clutch arrangement in which the engaging pressure is applied at spaced locations around the clutch through mechanisms including links and levers. Some of these advantages are a uniform and continuous application of the engaging pressure around the clutch, quick action in engagement and disengagement which is particularly important when the associated machine is designed for repetitive, short working cycles, and capacity for rapid acceleration and deceleration and quick reversals.

When employed under the foregoing conditions, the efficient control and dissipation of the generated heat presents a serious problem because it is important that the fluid cylinder assembly, including the release springs, be kept relatively cool.

One object of my invention is to provide a fluid operated clutch in which important manufacturing and operating advantages, relative to prior clutches of this type, are achieved by the manner of forming the air cylinder and of relating the piston and clutch pressure plate thereto.

A further object is the provision in the foregoing type of clutch of means, other than the piston, for piloting the piston during its movements in order to lessen wear on the piston packing.

A further object is to devise a clutch of the character indicated wherein the member which defines a portion of the air cylinder also carries the release springs and transmits the reactive thrust of the fluid medium.

A further object is to provide a release spring mechanism for a clutch of the type wherein a pressure plate has toothed driving engagement with a hub or generally any rotating member, the mechanism being arranged to accommodate relative rotative movements of the plate due to worn teeth without hampering the effectiveness of the mechanism.

These and further objects of my invention will be set forth in the following specification, reference being had to the accompanying drawings, and the novel means by which said objects are effectuated will be definitely pointed out in the claims.

In the drawings:

Fig. 1 is a longitudinal section of my improved clutch in disengaged position taken along the line 1—1 in Fig. 2.

Fig. 2 is an end view of the clutch looking in the direction of the arrow 2 in Fig. 1.

Fig. 3 is an enlarged, fragmentary, sectional view of the clutch as shown in Fig. 1, but in engaged position.

Fig. 4 is an enlarged elevation of the head end of the spring bolt as viewed in Fig. 1.

Fig. 5 is an enlarged, fragmentary view of the clutch engaging face of the pressure plate showing the relation of the head end of the spring bolt thereto.

Referring to the drawings, the numeral 10 designates a shaft which for purpose of description will be regarded as the driven member and which is secured by a key 11 to a hub 12 having at one end a flange 13 which acts as the back or abutment plate of the clutch. The hub is peripherally splined or toothed at 14 for axially slidable and rotarily driven engagement with internally toothed plates 15 that are alternately related to friction plates 16 which are externally toothed for engagement with a driving member (not shown), such as a flywheel or other part. The direction of drive through the clutch may be reversed without affecting its operability.

A ring 17 abuts the end of the hub 12 remote from the flange 13 and is secured thereto by means of a plurality of cap screws 18. This ring is provided with a peripheral and continuous, annular wall 19 that extends toward the clutch plates 15 and 16 and forms with the adjacent end of the hub 12 an annular cylinder 20. Slidably mounted in the cylinder is a piston assembly comprising a piston 21 provided with suitable packing 22 that may be cup-shaped and an annular extension 23 that projects laterally from and is preferably integrally formed with a pressure plate 24 which, in the released position of the clutch shown in Fig. 1, abuts the inner end of the wall 19. The piston 21 abuts and is carried on the extension 23, cap screws 25 serving to rigidly secure these parts together, while the extension pilots the pressure plate 24 and the piston 21 in the cylinder 20, thus enabling the plate and piston to move freely without cocking and reducing wear of the packing 22. The radial portion of the packing is clamped between the piston 21 and extension 23.

The plate 24 is internally toothed for driving engagement with the teeth 14, thus preventing, by reason of the rigid connection of this plate to the piston assembly, any rotation of the piston 21 relative to the cylinder. But for this connection, such rotation would occur during engagement and disengagement of the clutch and would result in undue wear of the piston packing 22 with consequent leakage or "blow by" of the air. In a clutch whose working cycle is repeated at short intervals, this wear becomes critical and requires frequent servicing of the unit. Further, where it is necessary that the clutch be quick acting, air leakage must be reduced to the utmost minimum, otherwise the clutch will be characterized by slow action.

Air, or any desired fluid, is introduced into the cylinder 20 through connecting passages in the shaft 10 and hub 12. Specifically, a rotating air seal (not shown) is applied to either end of the shaft 10, depending upon the position relation of the load to the clutch, the right end being selected in the present instance. The shaft 10 extends through the ring 17 and would be supported normally in a bearing (not shown) before receiving the seal which provides a connection between a source of air under pressure and an axial passage 26 which extends part way through the shaft 10. Seals of this type are well known in the art. The inner end of the passage 26 communicates with radial passages 27 in the shaft each of which is aligned with a radial passage 28 of larger diameter in the hub 12 and the outer end of each passage 28 is closed by a plug 29. Longitudinal passages 30 in the hub connect the several passages 28 with radial recesses 31 in the ring 17, the outer ends of the recesses communicating with the cylinder 20. The difference in diameters of the passages 27 and 28 creates annular shoulders 32 constituting parts of the shaft surface and a seal ring 32ᵃ is compressed against each of the shoulders by a nut 33 threaded in the inner end of the associated passage 28 to prevent air leakage along the shaft.

When air under pressure is supplied to the cylinder 20, the piston assembly, including the pressure plate 24, is moved toward the left from the position shown in Fig. 1 to that indicated in Fig. 3, thus clamping the plates 15 and 16 against the flange 13. The reactive thrust of the ring 17 is taken by the cap screws 18. Upon release of the air pressure, the clutch plates are freed for return to the release position shown in Fig. 1 by means of a spring actuated bolt arrangement which constitutes a feature of the invention. Extending inwardly from the clutch plate, contacting face of the pressure plate 24 is a plurality of circumferentially spaced sockets 34, each of which loosely receives the head 35 of a spring bolt 36 whose shank extends loosely through apertures 38 and 39 provided, respectively, in the plate 24 and the inner end of the wall 19 and thence into a pocket 40 disposed in aligned relation to the apertures in the wall 19 and plate 24.

A helical spring 41 encircles that portion of each shank which is included within the associated pocket, one end of the spring seating against the base of the pocket while the opposite end abuts a sleeve nut 42 that is threaded on the shank and slidably fits the pocket wall. When the clutch is engaged, the springs are compressed. The loose mounting of the bolts 36 in the pressure plate 24 and wall 19 enables these bolts to operate freely and without strain as the teeth of the pressure plate wear. This wear would permit small rotational movements of the plate 24 relative to the ring 17, but the ability of the bolts 36 to move angularly relative to the plate maintains the full functional capacity of the release mechanism. Rotation of each spring bolt 36 about its axis is prevented by providing a lug 43 (see Fig. 5) which is offset from the head 35 that is preferably cylindrical in shape and this lug loosely fits a groove 44 formed in the wall of the associated socket 34.

It is important to provide some method of cooling the springs 41 for unless the heat conducted to the springs from the pressure plate 24 is dissipated to a considerable extent, the springs quickly lose their temper and effectiveness. Accordingly, portions of the springs are exposed through the ring wall 19 to the cooling action of the atmosphere by means of continuous grooves 45 in and around this wall, the grooves being sufficiently deep to intersect the pockets 40. The grooves also assist in cooling the ring 17 and piston assembly by increasing the surface of the ring for radiation and the wiping action of the air as the clutch rotates.

It will be observed that the piston assembly in the retracted position illustrated in Fig. 1 substantially fills the cylinder 20. Where air is employed as the actuating medium and a quickly responsive action is desired, it is important in view of the highly compressible nature of air that the volume of air behind the piston in its retracted position be held to a minimum. The construction shown accomplishes this result.

The clutch is characterized, particularly in the air cylinder and operating mechanism portions thereof, by simplicity and compactness, ready access for repair and replacement, and long life of the parts by reason of the cooling and piloting features.

I claim:

1. A fluid operated clutch comprising in combination, a hub, friction members having toothed connection with the hub and a separate rotary part, respectively, a ring member abutting one end of the hub and forming therewith an annular cylinder for receiving the fluid medium, an annular piston movable in the cylinder, a clutch pressure plate having toothed connection with the hub, the plate being piloted in the cylinder and movable in one direction by the piston, a plurality of bolts spaced around the plate, each having a head loosely fitting within a socket provided in the plate and having a shank extending loosely through and into a correspondingly positioned pocket in the member, and a helical spring encircling each shank between an abutment thereon and the base of the associated pocket for shifting the plate in the opposite direction.

2. A fluid operated clutch comprising in combination, a hub, friction members having toothed connection with the hub and a separate rotary part, respectively, a ring member abutting one end of the hub and forming therewith an annular cylinder for receiving the fluid medium, an annular piston movable in the cylinder, a clutch pressure plate having toothed connection with the hub, the plate being piloted in the cylinder and movable in one direction by the piston, a plurality of bolts spaced around the plate, each having a head loosely fitting within a socket provided in the plate and having a shank extending loosely through and into a correspondingly positioned pocket in the member, the head and socket wall having interengaging formations preventing rotation of the bolt, and a helical spring encircling each shank between an abutment thereon and the base of the associated pocket for shifting the plate in the opposite direction.

3. In clutch construction wherein a pressure plate has a toothed connection with a rotary member and is shifted in one direction to engage the clutching members, means for shifting the plate in the opposite direction comprising a plurality of bolts spaced around the plate each having a head loosely fitting within a socket provided in the plate and having a shank extending loosely through and into a correspondingly positioned pocket in the member whereby the bolts may move angularly relative to the plate, and a helical spring encircling each shank between an abutment thereon and the base of the associated pocket.

4. In clutch construction wherein a pressure plate has a toothed connection with a rotary member and is shifted in one direction to engage the clutching members, means for shifting the plate in the opposite direction comprising a plurality of bolts spaced around the plate each having a head loosely fitting within a socket provided in the plate and having a shank extending loosely through and into a correspondingly positioned pocket in the member whereby the bolts may move angularly relative to the plate, the head and socket wall having interengaging formations preventing rotation of the bolt, and a helical spring encircling each shank between an abutment thereon and the base of the associated pocket.

5. A fluid operated clutch comprising a hub having an annular cylinder for receiving the fluid medium, an annular piston movable in the cylinder, a clutch pressure plate having toothed connection with the hub, the plate being movable in one direction by the piston, a plurality of bolts spaced around the plate, each having a head loosely fitting within a socket provided in the plate and having a shank extending loosely through and into a correspondingly positioned pocket in the member, and a helical spring encircling each shank between an abutment thereon and the base of the associated pocket for shifting the plate in the opposite direction.

6. A fluid operated clutch comprising a hub having an annular cylinder for receiving the fluid medium, an annular piston movable in the cylinder, a clutch pressure plate having toothed connection with the hub, the plate being movable in one direction by the piston, a plurality of bolts spaced around the plate, each having a head loosely fitting within a socket provided in the plate and having a shank extending loosely through and into a correspondingly positioned pocket in the member, the head and socket wall having interengaging formations preventing rotation of the bolt, and a helical spring encircling each shank between an abutment thereon and the base of the associated pocket for shifting the plate in the opposite direction.

HARRY H. VANDERZEE.